United States Patent
Chang et al.

(10) Patent No.: US 10,803,003 B1
(45) Date of Patent: Oct. 13, 2020

(54) METHOD FOR OPERATING DATA RECORDING SYSTEM

(71) Applicants: Inventec (Pudong) Technology Corp., Shanghai (CN); Inventec Corporation, Taipei (TW)

(72) Inventors: Yu-Lin Chang, Taipei (TW); Kai-Yang Tung, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 16/706,785

(22) Filed: Dec. 8, 2019

(30) Foreign Application Priority Data

Sep. 6, 2019 (CN) .......................... 2019 1 0844240

(51) Int. Cl.
*G06F 13/40* (2006.01)
*G06F 9/4401* (2018.01)

(52) U.S. Cl.
CPC .......... *G06F 13/4068* (2013.01); *G06F 9/442* (2013.01)

(58) Field of Classification Search
None
See application file for complete search history.

(56) References Cited

U.S. PATENT DOCUMENTS

2007/0136631 A1\* 6/2007 Govani .......... G01R 31/318536
714/738

\* cited by examiner

*Primary Examiner* — Henry Tsai
*Assistant Examiner* — Aurangzeb Hassan
(74) *Attorney, Agent, or Firm* — Winston Hsu

(57) ABSTRACT

A data recording system includes a host terminal and a data recorder. The host terminal defines a first module card to be corresponding to a first data channel and a first module card slot of the data recorder. The first module card is inserted into the first module card slot, and the data recorder stores a first type of data captured from the first data channel to the first module card. The host terminal has the data recorder stop capturing the first type of data, and defines a second module card to be corresponding to a second data channel and the first module card slot of the data recorder. The data recorder is shut down, and the first module card is dismounted from the first module card slot. The second module card is inserted into the first module card slot, and the data recorder is rebooted.

9 Claims, 2 Drawing Sheets

METHOD FOR OPERATING DATA RECORDING SYSTEM

BACKGROUND OF THE INVENTION

1. Field of the Invention

The present invention is related to a method for operating data recording system, and more particularly to a method for swapping module cards on a data recording system.

2. Description of the Prior Art

When testing the server, the data recorder is often coupled to the component to be tested or the sensor in the system, and can be used to capture and record various sensing signals, such as direct current (DC) voltage signals, alternating current (AC) voltage signals, DC current signals, AC current signals, frequency signals, temperature signals and pressure signals. The data recorder includes a plurality of module card slots, each can be inserted by a module card. Each of the module cards can be connected to the corresponding point to be tested through a specific channel, and store the sensing signal transmitted from the corresponding sensing point.

However, since the testing points to which each module card corresponds are fixed, during the test process, if the user attempts to swap the module card to record the data of other testing points, it is likely to cause data loss or break the data recorder. Therefore, in prior art, when a user attempts to record data of other testing points, new data recorders would be needed, thereby increasing the testing cost and causing inflexibility to the testing procedure.

SUMMARY OF THE INVENTION

One embodiment of the present invention discloses a method for operating a data recording system. The data recording system includes a host terminal and a first data recorder. The first data recorder is coupled to the host terminal and includes a plurality of module card slots and a plurality of data channels.

The method includes the host terminal defining a first module card to be corresponding to a first data channel of the plurality of data channels of the first data recorder and a first module card slot of the plurality of module card slots of the first data recorder, inserting the first module card into the first module card slot, the first data recorder storing a first type of data captured from the first data channel to the first module card, the host terminal having the first data recorder stop capturing the first type of data, the host terminal defining a second module card to be corresponding to a second data channel of the plurality of data channels of the first data recorder and the first module card slot of the first data recorder, shutting down the first data recorder, dismounting the first module card from the first module card slot, inserting the second module card into the first module card slot, and rebooting the first data recorder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
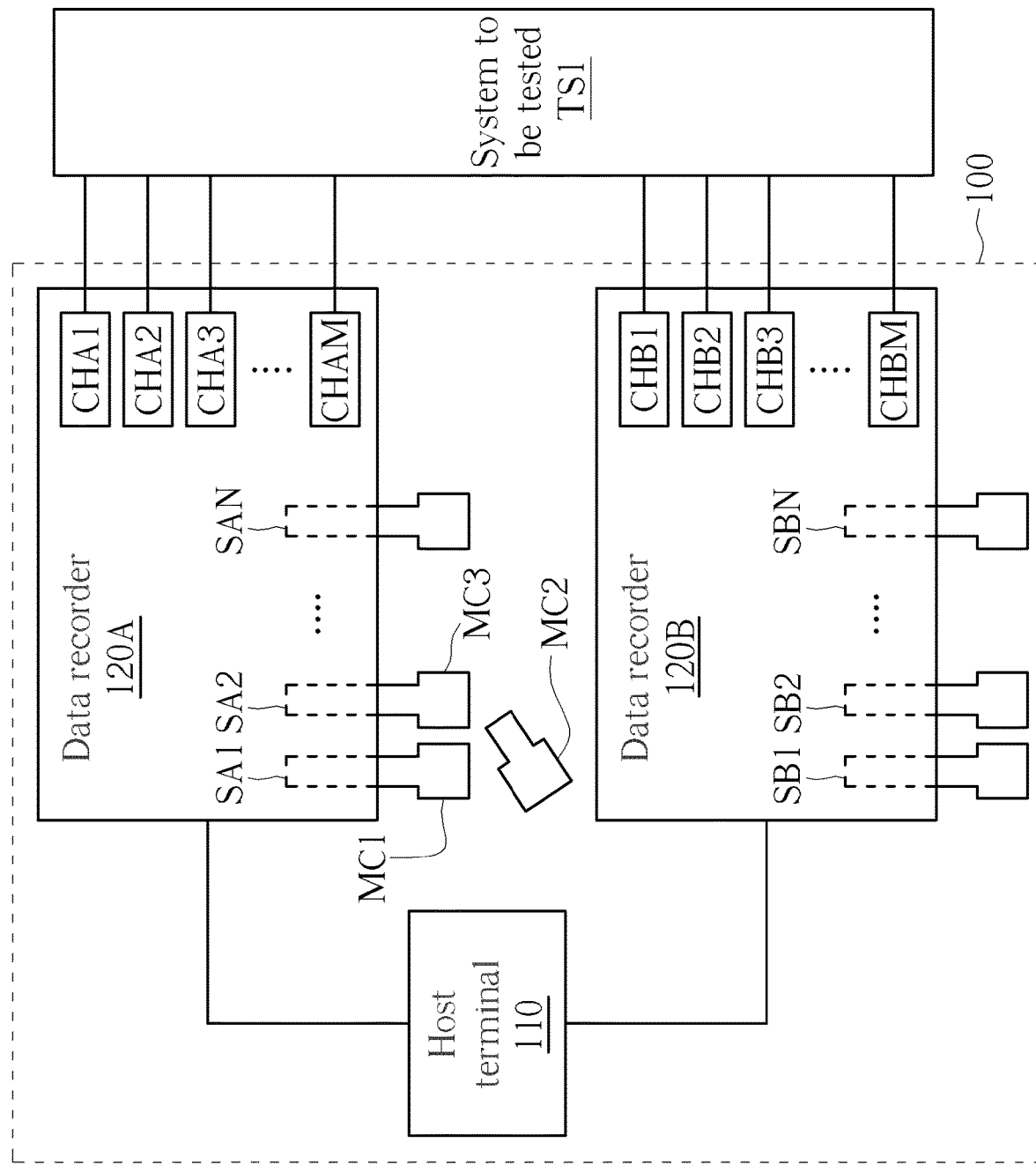
FIG. 1 shows a data recording system according to one embodiment of the present invention.

FIG. 1 shows a data recording system 100 according to one embodiment of the present invention. The data recording system 100 includes a host terminal 110 and a data recorder 120A. The data recorder 120A includes a plurality of module card slots SA1 to SAN and a plurality of data channels CHA1 to CHAM, where N and M are positive integers.

In some embodiments, the data channels CHA1 to CHAM of the data recorder 120A can be coupled to different testing points of the system TS to be tested. The user can insert the module cards MC1 to MCN into the module card slots SA1 to SAN, and can control the host terminal 110 to define the data channels to which the module cards MC1 to MCN are corresponding so as to capture and record the data of the testing points.

Figure 2:
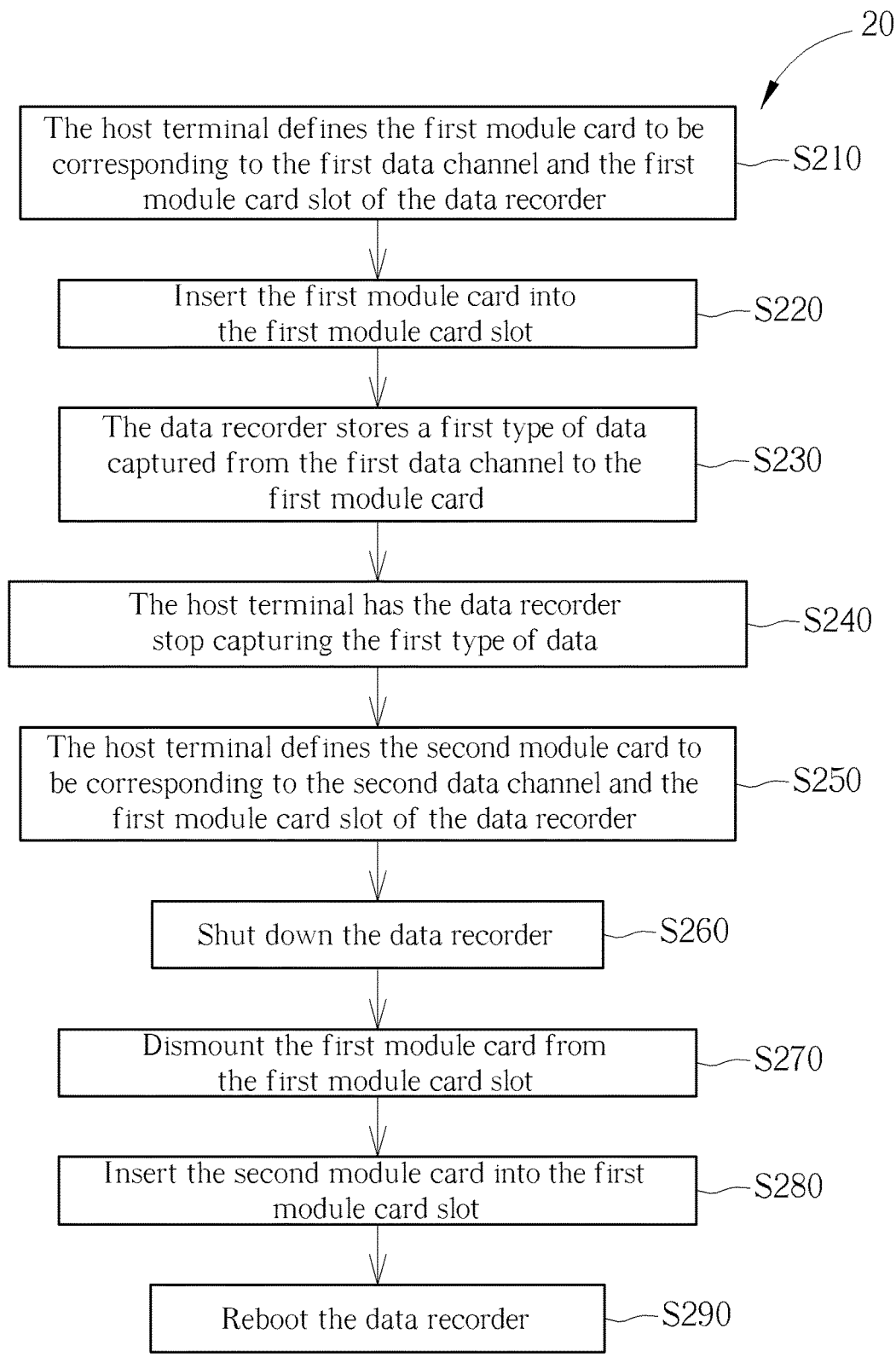
FIG. 2 shows a flow chart of a method for operating the data recording system in FIG. 1 according to one embodiment of the present invention.

FIG. 2 shows a flow chart of a method 200 for operating the data recording system 100 according to one embodiment of the present invention. The method 200 includes steps S210 to S290.

S210: the host terminal 110 defines the module card MC1 to be corresponding to the data channel CHA1 and the module card slot SA1 of the data recorder 120A;

S220: insert the module card MC1 into the module card slot SA1;

S230: the data recorder 120A stores a first type of data DA1 captured from the data channel CHA1 to the module card MC1;

S240: the host terminal 110 has the data recorder 120A stop capturing the first type of data DA1;

S250: the host terminal 110 defines the module card MC2 to be corresponding to the data channel CHA2 and the module card slot SA1 of the data recorder 120A;

S260: shut down the data recorder 120A;

S270: dismount the module card MC1 from the module card slot SA1;

S280: insert the module card MC2 into the module card slot SA1;

S290: reboot the data recorder 120A.

In the data recording system 100, each module card can have a specific serial number and can be used to store a specific type of data. Therefore, when the user attempts to use the module card MC1 to record the data measured at a specific testing point of the system TS1 to be tested, the host terminal 110 will define the corresponding relation between the data channel CHA1 and the module card MC1 and the corresponding relation between the module card slot SA1 and the module card MC1. In some embodiments, the user can use the interface provided by the host terminal 110 to control the host terminal 110 so as to control the data recorder 120A.

Afterward, in step S220, the user can insert the module card MC1 into the module card slot SA1 and activate the data recorder 120A, so the data recorder 120A can store the first type of data DA1 captured from the data channel CHA1 to the module card MC1 in step S230.

In some embodiments, if the user attempts to swap the module card MC1 to record data of another testing point, the user can control the host terminal 110 to have the data recorder 120A stop capturing the first type of data DA1 in step S240 so as to prevent the data recorder 120A from failing to access the new module card and/or to prevent data loss caused by the auto-rebooting of the data recorder 120A during the swapping process of the module cards.

In addition, before replacing the module card MC1 with the module card MC2, the user needs to define the data channel that corresponds to the module card MC2 through the host terminal as indicated in step S250. For example, the module card MC2 can store the data of another testing point in the system TS1 to be tested through another data channel CHA2 of the data recorder 120A. Furthermore, the host terminal 110 can also define the corresponding relation between the module card MC2 and the module card slot SA1 to be inserted, ensuring the data recorder 120A to store the data of the new testing point to the module card MC2 successfully after rebooting.

After the setting operation in step S250 is performed, the user can shut down the data recorder 120A in step S260. Later, in steps S270 and S280, the module card MC1 can be dismounted from the module card slot SA1, and the module card MC2 can be inserted to the module card slot SA1. After the module card MC2 is inserted to the module card slot SA1, the data recorder 120A can be rebooted in step S290. After the data recorder 120A is rebooted, the data recorder 120A can store the second type of data captured from the data channel CHA2 to the module card MC2.

In some embodiments, since the data recorder 120A needs to keep capturing data, the host terminal 110 can generate redundant data, for example but not limited to N/A, to replace the first type of data when the data recorder 120A is requested to stop capturing the first type of data. Therefore, when the data recorder 120A is requested to stop capturing the first type of data, the data recorder 120A can still capture the redundant data, so the data recorder 120A can keep functioning without being interrupted. Similarly, when the data recorder 120A is shut down, the host terminal 110 can keep generating the redundant data to replace the first type of data.

Furthermore, in some embodiments, the first type of data and the second type of data are different types of data. For example, the first type of data can be temperature data while the second type of data can be current data. However, in some other embodiments, the first type of data and the second type of data can be other types of data, and can be the same type of data or different types of data.

Consequently, with the method 200, the module cards can be swapped on the data recorder 120A without affecting the operation of the data recording system 100, so that the testing process can be more flexible and the hardware cost can be reduced.

In addition, in some embodiments, the data recording system 100 can include more data recorders. For example, in FIG. 1, the data recording system 100 can further include a data recorder 120B. The data recorder 120B can be coupled to the host terminal 110 so the user can control the data recorder 120B through the host terminal 110. The data recorder 120B and the data recorder 120A can have similar functions, and the data recorder 120B can include a plurality of module card slots SB1 to SBN and a plurality of data channels CHB1 to CHBM.

Since the data recorders 120A and 120B can operate independently, the data recorder 120B can keep capturing data even when the host terminal 110 has the data recorder 120A stop capturing the first type of data. Similarly, when the data recorder 120A is shut down, the data recorder 120B can still keep capturing data.

Also, in FIG. 1, the module card MC3 is inserted in to the module card slot SA2 of the data recorder 120A. The module card MC3 can be corresponding to the data channel CHA3 of the data recorder 120A. That is, the data recorder 120A can store the third type of data captured from the data channel CHA3 to the module card MC3. In some embodiments, when the host terminal 110 has the data recorder 120A stop capturing the first type of data, the data recorder 120A would also stop capturing the third type of data. Therefore, to prevent the third type of data from being lost, the host terminal 110 can also store the third type of data captured from the data channel CHA3 to the internal memory.

In summary, the methods for operating the data recording system provided by the embodiments of the present invention can stop capturing data before swapping the module cards, and perform the swapping after defining the corresponding relation between the new module card and the data channel and the corresponding relation between the new module card and the module card slot. Consequently, after the module cards are swapped, the data recorder can still access the newly inserted module card and continue to record the data of another testing point, thereby making the testing process more flexible, increasing the usage efficiency of data recorder, and reducing the hardware costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating a data recording system, the data recording system comprising a host terminal and a first data recorder, the first data recorder being coupled to the host terminal and comprising a plurality of module card slots and a plurality of data channels, the method for operating a data recording system comprising:

the host terminal defining a first module card to be corresponding to a first data channel of the plurality of data channels of the first data recorder and a first module card slot of the plurality of module card slots of the first data recorder;

inserting the first module card into the first module card slot;

the first data recorder storing a first type of data captured from the first data channel to the first module card;

the host terminal having the first data recorder stop capturing the first type of data;

the host terminal defining a second module card to be corresponding to a second data channel of the plurality of data channels of the first data recorder and the first module card slot of the first data recorder;

shutting down the first data recorder;

dismounting the first module card from the first module card slot;

inserting the second module card into the first module card slot;

rebooting the first data recorder; and after the first data recorder is rebooted, the first data recorder storing a second type of data captured from the second data channel to the second module card;

wherein the first type of data and the second type of data are of different types.

2. The method for operating the data recording system of claim 1, wherein the first data channel and the second data channel are corresponding to two different testing points of a circuit under test.

3. The method for operating the data recording system of claim 2, wherein the first type of data and the second type of data are of different types.

4. The method for operating the data recording system of claim 1, wherein:
the data recording system further comprises a second data recorder coupled to the host terminal; and
the second data recorder comprises a plurality of module card slots and a plurality of data channels.

5. The method for operating the data recording system of claim 4, wherein:
when the host terminal has the first data recorder stop capturing the first type of data, the second data recorder continues capturing data.

6. The method for operating the data recording system of claim 5, wherein:
when the first data recorder is shut down, the second data recorder continues capturing data.

7. The method for operating the data recording system of claim 1 further comprising:
when the host terminal has the first data recorder stop capturing the first type of data, the host terminal generating redundant data to replace the first type of data.

8. The method for operating the data recording system of claim 1 further comprising:
when the first data recorder is shut down, the host terminal generating redundant data to replace the first type of data.

9. The method for operating the data recording system of claim 1 wherein:
a third module card is inserted into a second module card slot of the plurality of module card slots of the first data recorder;
the third module card is corresponding to a third data channel of the plurality of data channels;
the first data recorder stores a third type of data captured from the third data channel to the third module card; and
when the host terminal has the first data recorder stop capturing the first type of data, the first data recorder stops capturing the third type of data, and the host terminal stores the third type of data captured from the third data channel to an internal memory temporarily.

* * * * *